United States Patent
Kim et al.

(10) Patent No.: US 8,539,255 B2
(45) Date of Patent: Sep. 17, 2013

(54) VARIABLE POWER OVER ETHERNET BASED ON LINK DELAY MEASUREMENT

(75) Inventors: Yongbum Kim, San Jose, CA (US); Michael D. Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 938 days.

(21) Appl. No.: 12/115,822

(22) Filed: May 6, 2008

(65) Prior Publication Data

US 2009/0210725 A1 Aug. 20, 2009

Related U.S. Application Data

(60) Provisional application No. 61/028,776, filed on Feb. 14, 2008.

(51) Int. Cl.
*G06F 1/00* (2006.01)
*H04M 9/00* (2006.01)

(52) U.S. Cl.
USPC .......................... 713/300; 455/402; 398/140

(58) Field of Classification Search
USPC .......................... 713/300; 455/402; 398/140
See application file for complete search history.

(56) References Cited

U.S. PATENT DOCUMENTS

| | | | |
|---|---|---|---|
| 6,614,236 B1* | 9/2003 | Karam | 324/532 |
| 7,164,274 B2 | 1/2007 | Pham et al. | |
| 7,404,091 B1* | 7/2008 | Gere | 713/300 |
| 7,856,028 B2* | 12/2010 | Yousefi et al. | 370/419 |
| 2005/0262364 A1* | 11/2005 | Diab et al. | 713/300 |
| 2006/0133813 A1* | 6/2006 | Ekkizogloy et al. | 398/135 |
| 2006/0149978 A1 | 7/2006 | Randall et al. | |
| 2006/0273661 A1* | 12/2006 | Toebes et al. | 307/106 |
| 2007/0121663 A1* | 5/2007 | Yousefi et al. | 370/446 |
| 2008/0005600 A1 | 1/2008 | Diab et al. | |
| 2008/0005601 A1 | 1/2008 | Diab | |
| 2008/0005602 A1 | 1/2008 | Diab et al. | |
| 2008/0016263 A1 | 1/2008 | Diab et al. | |
| 2008/0129118 A1* | 6/2008 | Diab | 307/35 |
| 2008/0252307 A1* | 10/2008 | Schindler | 324/713 |
| 2008/0311877 A1* | 12/2008 | Darshan | 455/402 |

OTHER PUBLICATIONS

Network Elements, 5 pages.
"Cisco Inline Power and IEEE 802.3af", Cisco Systems Inc., 2004, 13 pages.
"Timing and Synchronization for Time-Sensitive Applications in Bridged Local Area Networks", Interworking Task Group of IEEE 802.1 Local and Metropolitan Area Networks, Jul. 27, 2007, pp. 1-249.
"Part 3: Carrier Sense Multiple Access with Collision Detection (CSMA/CD) access method and physical layer specifications", Revision of IEEE Standards 802.3, 2005, pp. 1-810.
"IEEE 802.3af Power Interface Switch for Power over Ethernet (PoE) Powered Devices", Texas Instruments, Aug. 2002, 16 pages.

* cited by examiner

*Primary Examiner* — Vincent Tran
(74) *Attorney, Agent, or Firm* — McDermott Will & Emery LLP

(57) ABSTRACT

According to an example embodiment, an apparatus at a power source equipment (PSE) may include a transceiver configured to transmit and receive data via a communications link with a powered device (PD), and a controller configured to: determine a propagation delay of the communications link based on a message exchange between the PSE and the PD, the PSE and PD being connected via the communications link; and determine an amount of power to be supplied via Power Over Ethernet (POE) from the PSE to the PD via the communications link based on the propagation delay of the communications link.

18 Claims, 6 Drawing Sheets

VARIABLE POWER OVER ETHERNET BASED ON LINK DELAY MEASUREMENT

CROSS-REFERENCE TO RELATED APPLICATIONS

This application claims priority to U.S. Provisional application Ser. No. 61/028,776, filed on Feb. 14, 2008, entitle "Variable Power Over Ethernet Based on Link Delay Measurement," hereby incorporated by reference.

BACKGROUND

Ethernet communications provide high speed data communications over a communications link between communication nodes (or network devices) that are operating according to the IEEE 802.3 Ethernet standard. The communications medium between the two nodes can be twisted pair wires for Ethernet, or other types of communications medium that are appropriate. Powers over Ethernet (POE) communication systems, based on IEEE 802.3af, may provide power and data communications over a common communications link. More specifically, a power source device (e.g., power source equipment (PSE)) connected to the physical layer of the first node of the communications link provides DC power (for example, 48 volts DC) to a powered device (PD) at the second node of the communications link. The DC power is transmitted simultaneously from PSE to PD over the same communications medium that high speed data is transmitted between PD and PSE. In this manner, a separate power cable may be avoided or unnecessary for the PD.

The PSE device may be a data switch, a computer, or other device, for example. A PSE may include one or more data ports (or Ethernet ports). Each port may include a transceiver to transmit and receive data over a data link or communications medium (e.g., one or more twisted pair wires, or Ethernet cable) that may be connected to a data port on another device or node. Herein, data ports and their corresponding links can be interchangeably referred to as data channels, communication links, data links, etc, for ease of discussion.

Typical PD devices that use POE to receive power may include a wide variety of devices, such as, for example, Internet Protocol (IP) phones (Voice over IP (VoIP) phones), wireless access points, personal computing devices, such as a personal computer or a laptop computer, handheld devices, a camera (e.g., IP security camera), a print server, or other electronic device. Each type of PD may have a different power requirement. For example, the power requirements of personal computing devices (e.g., laptops) are typically significantly higher than that of VoIP phones, wireless access points, and other limited purpose devices (e.g., print server). In addition, a personal computing device may change its power draw depending on its application load. Moreover, personal computing devices can power other devices such as USB devices or external drives, for example, which will affect total power draw.

A PSE device (e.g., a PSE switch) may typically have a POE power budget, which may indicate a maximum amount of power (e.g., 200 W) available to provide to one or more connected PDs (connected via one or more Ethernet ports). IEEE 802.3af allows a maximum length of 100 meters for an Ethernet cable or link between a PSE and PD. In allocating power to a PD, PSE devices typically assume that each PD is connected via a maximum length (100 m) cable. Although, in some cases, PDs may be connected to the PSE via shorter length links or cables. By assuming a 100 meter (or maximum length) link or cable for all connected PDs, this may cause a PSE to allocate to each PD a greater amount of power than is necessary. This may unnecessarily decrease the number of PDs that may be supported or the amount of power that is available for other PDs.

SUMMARY

Various embodiments are disclosed relating to variable power over Ethernet based on a link delay measurement.

DETAILED DESCRIPTION

Figure 1:
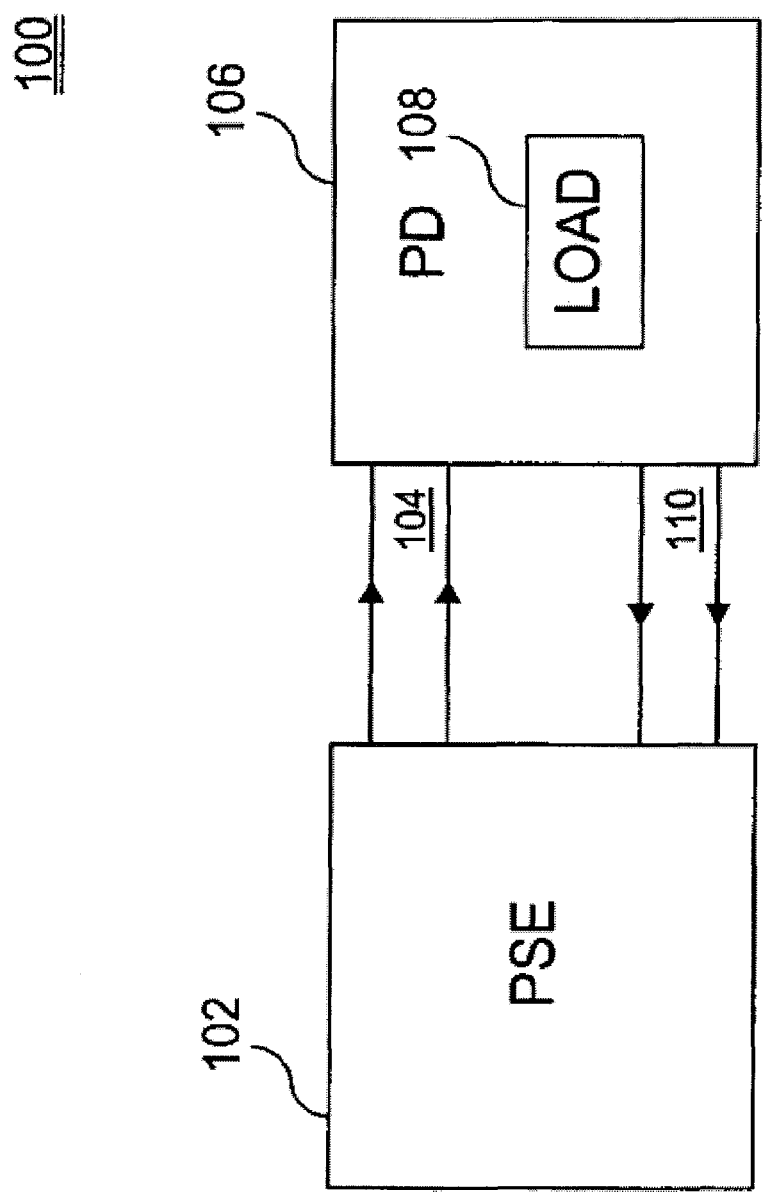
FIG. 1 is a high level illustration of a Power over Ethernet (POE) system 100 that provides both DC power and data communications over a common data communications medium according to an example embodiment.

FIG. 1 is a high level illustration of a Power over Ethernet (POE) system 100 that provides both DC power and data communications over a common data communications medium according to an example embodiment. Referring to FIG. 1, power source equipment (PSE) 102 provides DC power over conductors 104, 110 to a powered device (PD) 106 having a representative electrical load 108. The PSE 102 and PD 106 also include data transceivers (transmitter/receiver) that transmit and receive data according to, e.g., IEEE 802.3 Ethernet standard. The term POE herein may refer to providing power over a communications link either for Ethernet or other networking standard. Also, a more general term may be, for example, power over networking, which may include providing power over any networking or communications link (including POE). More specifically, the PSE 102 includes a physical layer device on the PSE side that transmits and receives high speed data with a corresponding physical layer device in the PD 106. Accordingly, the power transfer between the PSE 102 and the PD 106 may occur simultaneously with the exchange of high speed data over the conductors 104, 110. In one example, the PSE 102 may be a data switch having multiple ports that is in communication with one or more PD devices, such as Internet phones, or wireless access points, or other network devices.

In an example embodiment, the conductor pairs 104 and 110 may carry high speed differential data communications. In one example, the conductor pairs 104 and 110 each include one or more twisted wire pairs, or any other type of cable or communications media capable of carrying the data transmissions and DC power transmissions between the PSE and PD. For example, in Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused.

Herein, conductor pairs 104, 110 may also be referred to as wires, Ethernet cables, communication (or data) links, lines, communication medium or communication media, for ease of discussion.

Figure 2:
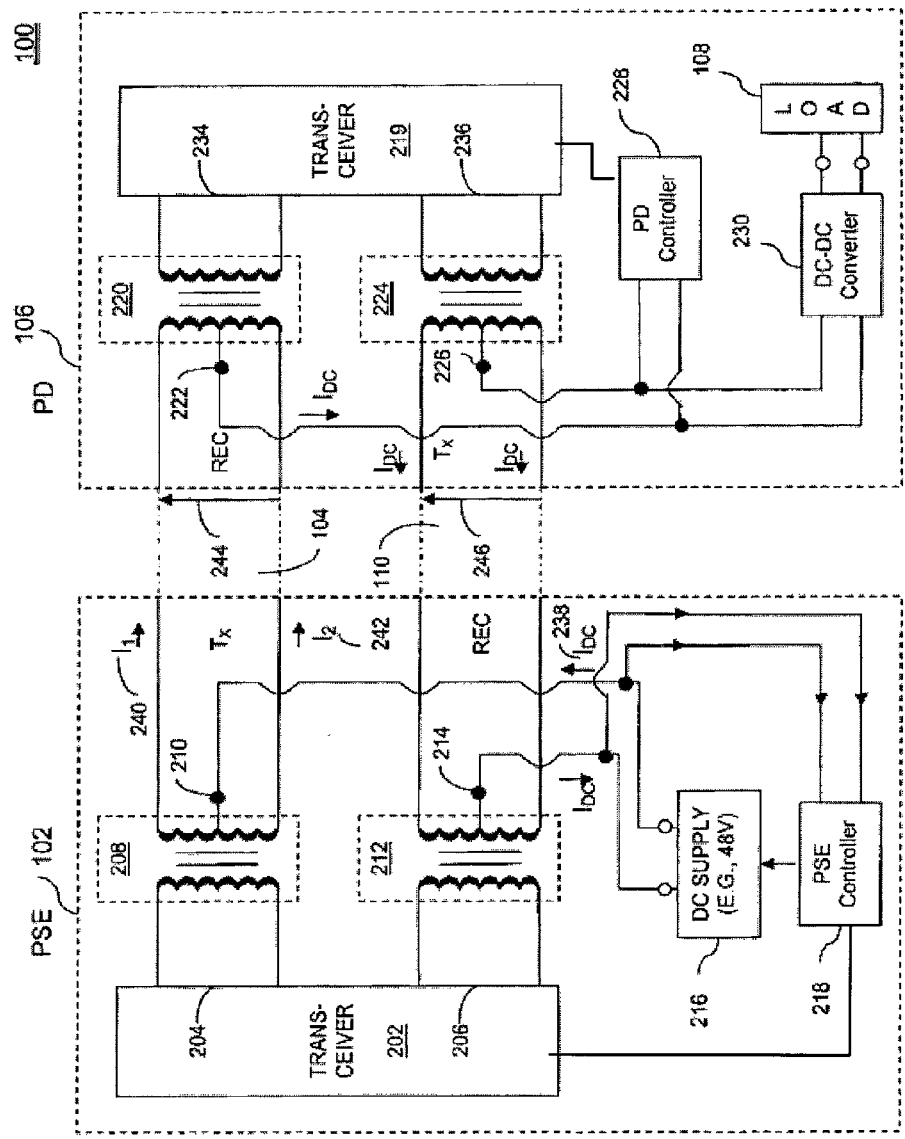
FIG. 2 provides a more detailed circuit diagram of the POE system 100, where PSE 102 provides DC power to PD 106 over conductor pairs 104 and 110, for example.

FIG. 2 provides a more detailed circuit diagram of the POE system 100, where PSE 102 provides DC power to PD 106 over conductor pairs 104 and 110, for example. PSE 102 includes a transceiver physical layer device (or PHY) 202 having full duplex transmit and receive capability through differential transmit port 204 and differential receive port 206. (Herein, transceivers may be referred to as PHYs.) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive to large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 212 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The PSE 102 further includes a PSE controller 218 that controls the DC voltage supply 216, e.g., based on a classification load provided by the PD (based on the POE classification of the PD) and/or based on a determined length (or link delay or propagation delay) of a communications link (e.g., Ethernet cable) connecting the PD 106 and PSE 102. As described in greater detail below, the length of the cable or communications link connecting the PSE 102 and PD 106 may be determined based on a propagation time for a packet transmitted across the communications link that connects the PD 106 and PSE 102. For example, if PSE 102 determines that the communications link (including conductor pairs 104, 110) between PD 106 and PSE 102 is shorter than the maximum length of 100 m, then the PSE may provide less, or may decrease, power to the PD.

Further, the PSE controller 218 may detect and validate a compatible PD, determine a power classification signature for the validated PD, determine a length of a communications link or cable between the PSD and PD, determine an amount of power to be supplied to the PD, and provide or supply power to the PD, monitors the power, and reduces or removes the power from the PD when the power is no longer requested or required. During detection, if the PSE finds the PD to be non-compatible, the PSE can prevent the application of power to that PD device, protecting the PD from possible damage.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 110 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts, for example) to supply different loads 108 of the PD 106.

The PD 106 further includes a PD controller 228 that monitors the voltage and current on the PD side of the POE configuration. The PD controller 228 further provides the necessary impedance signatures (e.g., a resistance of approximately 25 kilo-ohms) on the return conductor 110 during initialization, so that the PSE controller 218 will recognize the PD as a valid POE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the PSE 102 and the PD 106 occurs simultaneously with the DC power supply described above. Accordingly, in an example embodiment, a first communication signal 244 and/or a second communication signal 246 are simultaneously differentially carried via the conductor pairs 104 and 110 between the PSE 102 and the PD 106. It is important to note that the communication signals 244 and 246 are differential signals that typically are not affected by the DC power transfer.

As stated earlier, detection and power classification of a PD may be a part of the process of supplying power to a PD using POE. The PD controller 228 further provides the necessary impedance signatures (e.g., a resistance of approximately 25 kilo-ohms) on the return conductor 110 during initialization, so that the PSE controller 218 will recognize the PD as a valid POE device.

In an example embodiment, the PSE 102 may determine an amount of power to be provided to PD 106 via POE based at least in part on a determined link delay or length of the communications link (104, 110) connecting PD 106 and PSE 102. Either PSE 102 and/or PD 106 may determine a length of a communications link or a propagation delay of the communications link (conductors 104, 110) that connects PD 106 and PSE 102. For example, the amount power to be provided to PD 106 may be determined (e.g, at least in part) based on both a power classification and a length of the communications link (or link delay). Or, in another example embodiment, a classification load or signature supplied by PD 106 may be varied or adjusted based on the determined length of the communications link or the propagation delay of the communications link that connects PD 106 and PSE 102, or other power adjustment or selection may be performed based on a determined link delay or length of the communications link, as described in greater detail below. POE Power classification will be described, followed by a description of measuring or determining a communications link delay (or propagation delay) or measuring the length of the communications link (conductors 104, 110), and then adjusting or determining the POE power supplied to the PD 106 based, at least in part, on the length of the communications link or propagation delay of the communications link.

During an optional power classification, PD controller 228 of PD 106 may provide a classification signature (or classification load or classification resistance) onto the line, e.g., onto conductor 110 to indicate power requirements of the PD 106, for example. During power classification, the PSE 102 may apply a voltage, e.g., across the conductors or communication links 104, 110 of between 14.5 volts and 20.5 volts, and detects the resulting classification current. The resulting classification current may be determined based on $V/R_{class}$, where V is the voltage applied to the conductors by PSE 102 and $R_{class}$ is the classification load (resistance) or classification signature applied by PD 106 during the power classification. According to IEEE 802.3af, the power range provided by a PSE depends on the resulting classification current detected by the PSE, e.g., according to Table 1 below. Thus, applying a larger classification resistance may typically result in a lower classification current. Also, in the absence of classification, a PSE 102 may typically need to allocate the maximum power of 12.95 W to the PD 106. Table 1 merely illustrates some example power and current values for different PD classifications, and the disclosure is not limited thereto.

TABLE 1

| Class | Usage | Min Power to PD (W) | Max Power to PD (W) | Min classification current (mA) | Max classification current (mA) |
|---|---|---|---|---|---|
| 0 | Default | .44 | 12.95 | 0 | 4 |
| 1 | Optional | .44 | 3.84 | 9 | 12 |
| 2 | Optional | 3.84 | 6.49 | 17 | 20 |
| 3 | Optional | 6.49 | 12.95 | 26 | 30 |
| 4 | reserved | reserved | reserved | 36 | 44 |

According to an example embodiment, a PSE 102 may determine or measure a length of a communications link (e.g., length of an Ethernet cable or length of conductors 104, 110) connected between the PSE 102 and a connected PD 106. The PSE 102 may then adjust (e.g., decrease) an amount of power provided via POE to the PD 106 based on the length of the communications link.

In an example embodiment, PSE controller 218 of PSE 102 may determine a length of a communications link (e.g., conductors 104, 110) based on a propagation delay across the link (or link delay). Once the propagation delay across the link is known, the length of the link may be determined. For example, the length of a communications link (e.g., lengths of the Ethernet cable or conductors 104, 110 connecting PD 106 and PSE 102) may be determined based on Eqn. (1), for example.

$$\text{Length(of communications link)}=(\text{prop. delay})(\tfrac{2}{3}C) \quad \text{Eqn. (1)}$$

Where prop. delay is the measured or determined propagation delay for the link (in seconds), and C is the speed of light (approximately $3\times10^8$ meters/second). In this example, the propagation speed on the link has been determined to be $\tfrac{2}{3}$ of the speed of light, or $\tfrac{2}{3}C$.

In an example embodiment, the PSE 102 may then determine or adjust (or vary) the power supplied to the PD 106 via POE based on the length of the communications link connecting PSE 102 and PD 106 (or based on the link delay). There are several different ways in which PSE 102 may adjust or decrease the amount of power supplied to the PD. For example, for a maximum power of 3.84 W (watts) to be supplied to PD 106 as part of class 1, a portion of this allocated power may be required by the PD 106 (e.g., 1.84 W), and the remainder (2 W) may be required to provide such power via the 100 meter communications link, since power will be consumed or dissipated (via the link) to provide power to the PD 106 via the link due to the resistance of the communications link. This is merely an example, and other numbers for power may be used. The total resistance of the communications link may typically increase as the length of the link increases. Thus, for a simple example, a 100M link may have approximately twice as much resistance as a 50M link, assuming the links are otherwise the same or very similar.

Thus, in an example embodiment, 3.84 W maximum power may be specified, including 1.84 W to be provided to the PD 106, plus a total link power of 2 W may be used for the link (in this example), assuming a maximum length 100 m link. However, if the link is determined to be only 50 M, then the PSE 102 may decrease the supplied (or allocated) power by 1 W (to 2.84 W). Alternatively, if the lengths of the cable is only 10 meters, then only $\tfrac{1}{10}^{th}$ of the power allocated to the cable (0.2 W in this example) may be necessary to supply the 1.84 W to PD 106. Thus, in such example, the supplied power may be decreased from 3.84 W to 2.04 W due to use of a shorter communications link or Ethernet cable to connect PD 106 and PSE 102. There are many different ways in which a propagation delay and/or determined length for a communications link may be used to adjust or decrease supplied POE (or power over network) power. This is merely one example technique and others may be used as well to determine a power savings due to a shorter or actual length of the link or Ethernet cable.

By adjusting the POE supplied power based on the actual or determined length of the communications link (e.g., based on the propagation delay for the communications link) that connects the PD 106 and PSE 102, a lower and more accurate amount of power may (at least in some cases) be allocated by PSE 102 to PD 106 from the PSE's power budget. Thus, measuring or estimating the length of the communications link based on the propagation delay may allow a more accurate determination of the actual power required for the connected PD 106. This may allow unused power in the PSE's power budget to be used to power additional PDs, or may allow a PSE to power a same number of PDs using a lower amount of power or using a smaller power supply, for example.

In a similar manner, PD 106 may measure or determine a length of the communications link (e.g., length of conductors 104, 110 or Ethernet cable that connects PD 106 and PSE 102 based on the propagation delay for the communications link. PD 106 may determine or estimate a length of the communications link that connects PD 106 and PSE 102, e.g., based on Eqn. (1), or using other technique. Once PD 106 knows the actual link length, PD 106 may send a packet to PSE 102 indicating the actual length of the communications link or the propagation delay of the communications link (or associated reduction in power if a cable shorter than 100 m is used), or indicating an actual power to be supplied to PD 106. PSE 102 may then adjust the power supplied to PD 106 based on the actual length of the link (or based on link propagation delay) if PD 106 has indicated the length of the communications link (or propagation delay for the link), or PSE 102 may supply the requested power to PD 106 if PD 106 has indicated a requested power (taking into account length of the communications link).

Alternatively, PD 106 may provide a classification resistance or classification signature to PSE 102 based, at least in part, on the actual or measured length of the communications link or based on the measured or determined propagation delay for the communications link that connects PD 106 and PSE 102. For example, PD 106 may require a base power of 6 W (for the PD itself), plus 2 W associated with a maximum link length of 100 meters, requiring a total power of 8 W to be supplied by the PSE 102. If a communications link of length equal to 10 meters is used to connect PD 106 and PSE 102 (instead of 100 meters), a power savings of 1.8 W may result (for example), since only 10% of 2 W (or 0.2 W) may be required for the communications link. This may decrease the total power requirement for PSE 102 for PD 106 from 8 W to 6.2 W, in this simple example. Thus, in this example, due to the decrease in total power requirements from 8 W to 6.2 W, PD 106 may provide a classification signature or classification resistance associated with class 2 (requires power up to 6.49 W), rather than requiring a signature for class 3 (which requires power between 6.49 W to 12.95 W). Thus, by PD 106 measuring or determining an actual length of the communications link, a different classification signature or classification resistance may be provided by PD 106, which may result in PD 106 being classified differently by PSE 102, and a lower (or different) amount of power may be allocated or required by PSE 102. For example, PSE 102 may classify PD 106 as a class 2 device based on the adjusted classification signature provided by PD 106. Thus, in this example, PSE 102 may be required to allocate only 6.49 W to PD 106, rather than 12.95 W, based on a determination of a propagation delay or length of the communications link. This may save power at PSE 102, or may allow PSE 102 to power more devices for the same power budget, or may allow PSE 102 to re-allocate this saved power to other devices.

According to an example embodiment, a PSE and/or a PD may determine a propagation delay of a communications link that connects to the PSE and PD based on a message exchange to determine a packet delay across the communications link. The propagation delay for the communications link may be measured or determined as a packet delay from PSE to PD, or the packet delay from PD to PSE, or an average of these two delays, as examples. In an example embodiment, a propagation delay for a communications link may be determined by a PSE or PD based on a message exchange (e.g., synchronization message exchange or other message exchange) between a PSE and PD in accordance with (or compliant or consistent with) IEEE 802.1AS, such as a propagation time measurement using Pdelay (or delay) mechanism, for example.

Figure 3:
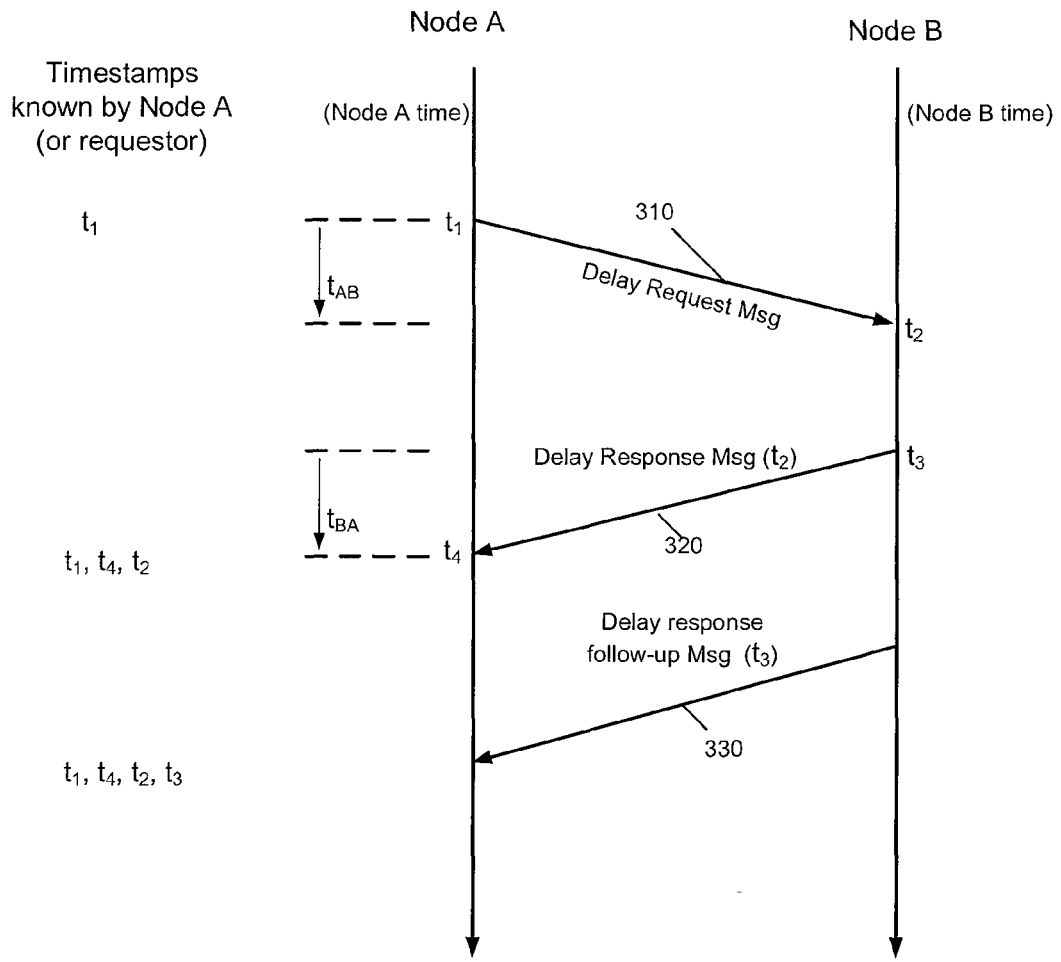
FIG. 3 is a timing diagram illustrating a technique that may be used to determine a propagation delay of a communications link based on a message exchange between two nodes according to an example embodiment.

FIG. 3 is a timing diagram illustrating a technique that may be used to determine a propagation delay of a communications link based on a message exchange between two nodes according to an example embodiment. Referring to FIG. 3, nodes A and B and shown, and each node (node A, node B) may include a local clock. Each node may be a PD or a PSE. For example, node A may be a PSE and node B a PD, or node A may be a PD and node B a PSE, for example. The technique of FIG. 3 may begin with node A (or the requesting node or device) generating a time stamp, $t_1$, for a delay request message 310. The responder, or node B, receives this delay request message 310, and time stamps it with the time of receipt, time $t_2$ (or records the time $t_2$ of receipt of message 310). The responder, or node B, returns a delay response message 320 to node A, and records the transmission time $t_3$ (or generates a time stamp $t_3$ at the time of transmission of message 320). Node B includes the time stamp $t_2$ in the delay response message 320. Node A receives the delay response message 320, and time stamps it upon receipt, with a receipt time $t_4$. Node B also includes the time stamp $t_3$ in a delay response follow-up message 330, which is received by node A. Note, for example, that times t1 and t4 may be specific to node A's local clock, while times t2 and t3 may be specific to node B's clock. Thus, after transmission of all three messages, 310, 320 and 330, that node A will know all four time stamps, $t_1$, $t_2$, $t_3$, and $t_4$. The propagation delay from node A to node B may be referred to as $t_{AB}$, while the propagation delay from node B to node A may be referred to as $t_{BA}$. The mean propagation delay (or propagation time) between nodes A and B across the communications link may be determined based on the following equations.

$$t_{AB}=t_2-t_1 \tag{Eqn. 2}$$

$$t_{BA}=t_4-t_3 \tag{Eqn. 3}$$

However, the local clocks for nodes A and B may not be synchronized, so the mean propagation delay may be calculated as:

$$T_{mean\text{-}prop}=(t_{AB}+t_{BA})/2=[(t_4-t_1)-(t_3-t_2)]/2. \tag{Eqn. 4}$$

Where, $t_4-t_1$ may be the total transmission time for messages 310 and 320 (including internal delays at node B), and $t_3-t_2$ may be the internal processing delay at node B (e.g., the time between receipt of message 310 and transmission of message 320). Subtracting these two values may provide the total (or sum) propagation delay for both directions, as a sum. This sum may then be divided by 2 to obtain an average or mean propagation delay for the communications link connecting a PSE and PD (or between nodes A and B). The accuracy of this calculation of mean (or average) propagation delay for the communications link may be impacted by, for example, how short the interval is for $t_3-t_2$, how accurately the times $t_1$, $t_2$, $t_3$, and $t_4$ are measured, how close the frequencies of the clocks of node A and node B are, and any additional internal delays at nodes A and B. This merely illustrates one example technique for measuring or determining a propagation delay for a communications link, and many other techniques may be used.

Figure 4:
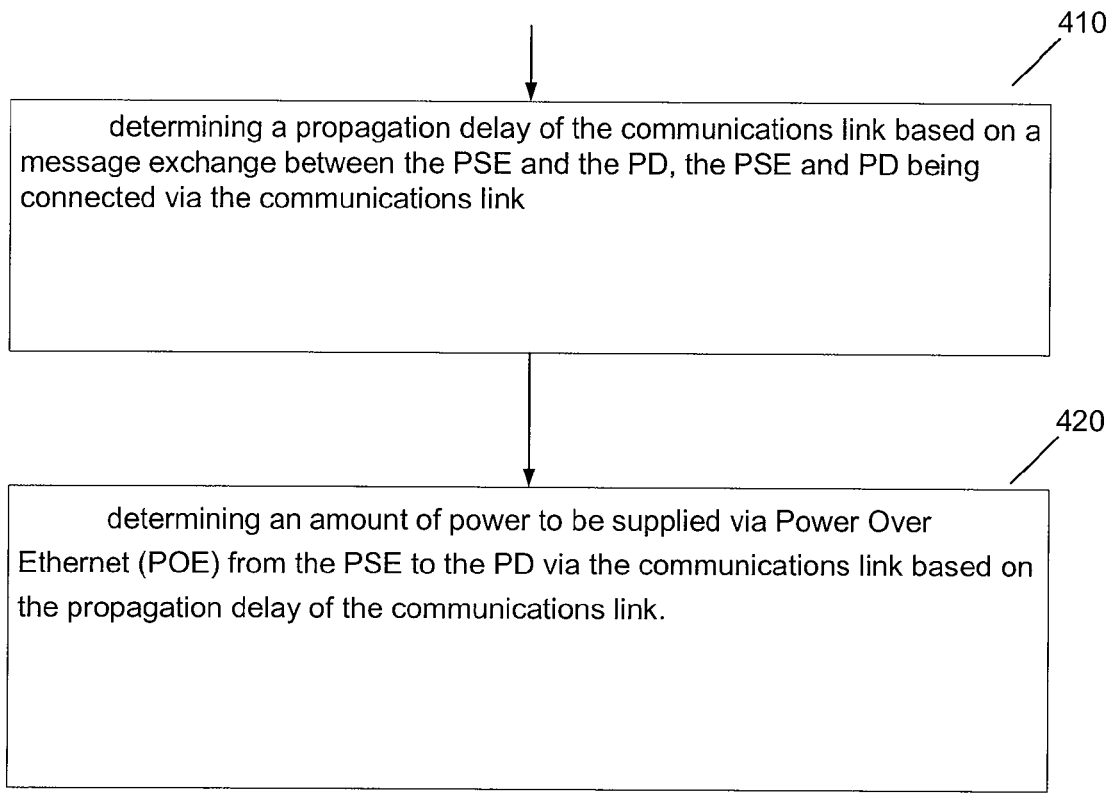
FIG. 4 is a flow chart illustrating operation of a power source equipment according to an example embodiment.

FIG. 4 is a flow chart illustrating operation of a power source equipment according to an example embodiment. At 310, the power source equipment (PSE) may determine a propagation delay of the communications link based on a message exchange between the PSE and the PD, the PSE and PD being connected via the communications link. At 320, the PSE may determine an amount of power to be supplied via POE from the PSE to the PD via the communications link based on the propagation delay of the communications link.

In another example embodiment, an apparatus at a power source equipment (PSE) may include a transceiver configured to transmit and receive data via a communications link with a powered device (PD), and a controller configured to: determine a propagation delay of the communications link based on a message exchange between the PSE and the PD, the PSE and PD being connected via the communications link; and determine an amount of power to be supplied via Power Over Ethernet (POE) from the PSE to the PD via the communications link based on the propagation delay of the communications link.

In an example embodiment, the controller may include a controller being configured to determine a power classification of the PD, and wherein the controller being configured to determine an amount of power to be supplied via POE from the PSE to the PD may include the controller being configured to determine an amount of power to be supplied via Power Over Ethernet (POE) from the PSE to the PD via the communications link based on the power classification of the PD and the propagation delay of the communications link.

In another example embodiment, the controller may be configured to determine a propagation delay based on a message exchange to determine a packet delay across the communications link.

In another example embodiment, the controller may be configured to determine a propagation delay based on a synchronization message exchange in accordance with IEEE 802.1AS to determine a packet delay across the communications link.

In another example embodiment, the PSE may also include a power supply, the controller being further configured to control the power supply to supply the determined amount of power to the PD via POE.

Figure 5:
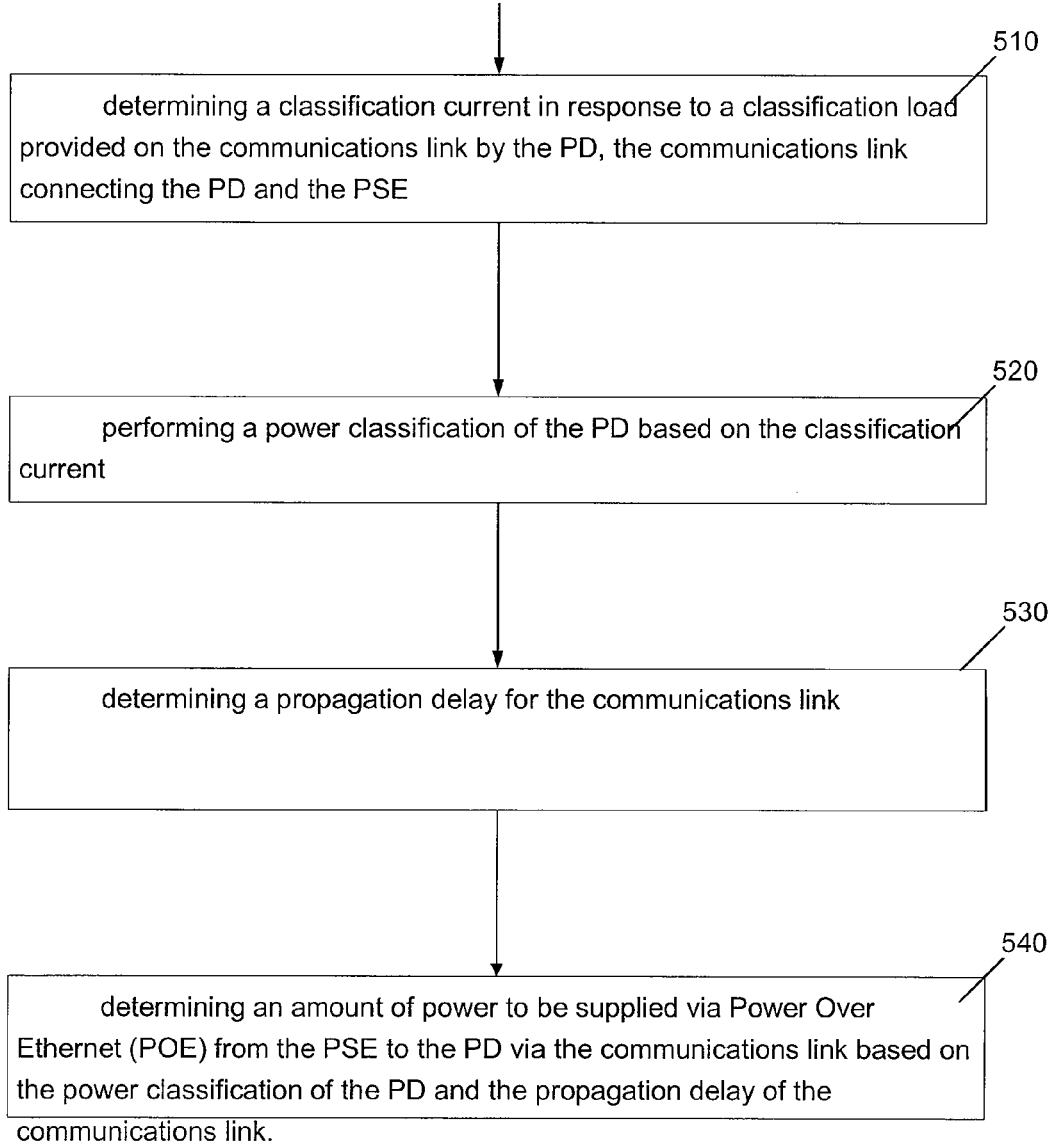
FIG. 5 is a flow chart illustrating operation of a PSE according to another example embodiment.

FIG. 5 is a flow chart illustrating operation of a PSE according to another example embodiment. Operation 510 may include determine a classification current in response to a classification load provided on the communications link by the PD, the communications link connecting the PD and the PSE. Operation 520 may include performing a power classification of the PD based on the classification current. Operation 530 may include determining a propagation delay for the communications link. Operation 540 may include determining an amount of power to be supplied via Power Over Ethernet (POE) from the PSE to the PD via the communications link based on the power classification of the PD and the propagation delay of the communications link.

In another example embodiment, an apparatus at a power source equipment (PSE) may include a transceiver configured to transmit and receive data via a communications link with a powered device (PD), and a controller configured to: determine a classification current a in response to a classification load provided on the communications link by the PD, the communications link connecting the PD and the PSE; perform a power classification of the PD based on the classification current; determine a propagation delay for the communications link; and determine an amount of power to be supplied via Power Over Ethernet (POE) from the PSE to the PD via the communications link based on the power classification of the PD and the propagation delay of the communications link.

In an example embodiment, the transceiver may include an Ethernet transceiver. In another example embodiment, the controller may be configured to determine a propagation delay for the communications link based on a synchronization message exchange between the PSE and the PD.

In another example embodiment, the controller may be configured to determine a propagation delay for the communications link based on a synchronization message exchange between the PSE and the PD in accordance with IEEE 802.1AS.

In another example embodiment, the controller may be configured to determine a propagation delay for the communications link based on an average of the propagation delay from the PSE to the PD and the PD to the PSE over the communications link.

In another example embodiment, the controller being configured to determine an amount of power to be supplied via Power over Ethernet from the PSE to the PD may include the controller being configured to: determine, based on the link propagation delay for the communications link, a length of the communications link; and determine an amount of power to be supplied via Power over Ethernet from the PSE to the PD via the communications link based on the power classification of the PD and the length of the communications link.

In an example embodiment, the controller being configured to determine an amount of power to be supplied via Power over Ethernet from the PSE to the PD may include the controller being configured to: determine, based on the link propagation delay for the communications link, a length of the communications link; determine if the length of the communications link is greater than or equal to a threshold length; determine a first amount of power to be supplied to the PD if the communications link has a length that is greater than or equal to the threshold length; and determine a second amount of power to be supplied to the PD if the length of the communications link is less than the threshold length, the second amount of power being less than the first amount of power.

In an example embodiment, the controller being configured to determine an amount of power to be supplied via Power over Ethernet from the PSE to the PD may include the controller being configured to: determine, based on the link propagation delay for the communications link, a length of the communications link; determine if the length of the communications link is greater than or equal to a threshold length; determine, based on the power classification of the PD and the length of the communications link, a first amount of power to be supplied to the PD associated with the power classification of the PD if the communications link has a length that is greater than or equal to the threshold length; and determine, based on the power classification of the PD and the length of the communications link, a second amount of power to be supplied to the PD if the length of the communications link is less than the threshold length, the second amount of power being less than the first amount of power.

In an example embodiment, the apparatus at the PSE may further include a power supply, the controller being further configured to control the power supply to supply the determined amount of power to the PD via POE.

Figure 6:
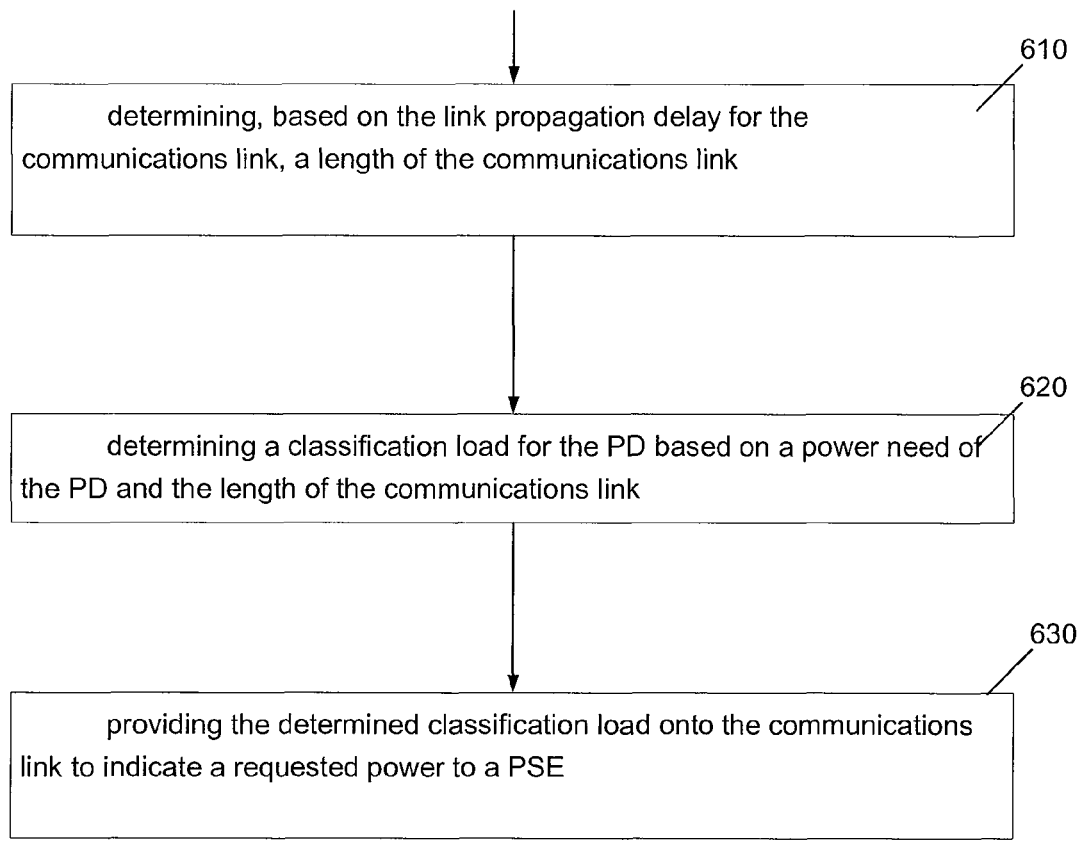
FIG. 6 is a flow chart illustrating operation of a PD according to an example embodiment.

FIG. 6 is a flow chart illustrating operation of a PD according to an example embodiment. Operation 610 may include determining, based on the link propagation delay for the communications link, a length of the communications link. Operation 620 may include determining a classification load for the PD based on a power need of the PD and the length of the communications link. Operation 630 may include providing the determined classification load onto the communications link to indicate a requested power to a PSE.

In an alternative embodiment, the PD may determine the propagation delay for the communications link, and then determine a desired or required power for the PD, based on the length of the link or the propagation delay of the communications link. The PD may then send a message to the PSE requesting the amount of power.

In an example embodiment, an apparatus at a powered device (PD) may include a transceiver configured to transmit and receive data via a communications link with a power source equipment (PSE), and a controller configured to: determine, based on the link propagation delay for the communications link, a length of the communications link; determine a classification load for the PD based on a power need of the PD and the length of the communications link; and provide the determined classification load onto the communications link to indicate a requested power to a PSE.

In an example embodiment, the controller configured to determine, based on the link propagation delay for the communications link, a length of the communications link may include the controller configured to determine a propagation delay for the communications link based on a synchronization message exchange between the PSE and the PD in accordance with IEEE 802.1AS, and to determine a length of the communications link.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus at a powered device (PD) comprising:
a transceiver configured to transmit and receive data via a communications link with a power source equipment (PSE); and
a controller configured to:
determine a length of the communications link;
determine a classification load for the PD based on a power need of the PD;
provide the determined classification load onto the communications link; and
send a packet from the PD to the PSE indicating the length of the communications link.

2. The apparatus of claim 1 wherein the controller configured to determine a length of the communications link comprises the controller configured to determine a propagation delay for the communications link based on a synchronization message exchange between the PSE and the PD in accordance with IEEE 802.1AS, and to determine a length of the communications link.

3. The apparatus of claim 1 wherein the controller being configured to determine a length of the communications link comprises the controller being configured to:
determine a propagation delay for the communications link; and
determine a length of the communications link based on the propagation delay of the communications link.

4. The apparatus of claim 1 wherein the classification load includes a resistance applied by the PD to the communications link to identify a power requested by the PD to the PSE.

5. The apparatus of claim 1 and further comprising the power source equipment (PSE) having a second controller that is configured to:
measure the power classification of the PD based on the classification load for the PD;
receive the packet from the PD indicating the length of the communications link; and
determine an amount of power to be supplied via Power Over Ethernet (POE) from the PSE to the PD based on the measured power classification and the received packet that indicates the length of the communications link.

6. The apparatus of claim 5 wherein the second controller of the PSE being configured to measure the power classification comprises the second controller being configured to:
cause a voltage to be applied to the communications link;
measure the resulting classification current;
determine the power classification of the PD based on the classification current in response to the classification load provided by the PD.

7. The apparatus of claim 1 and the apparatus of the PD being configured to receive power via Power Over Ethernet (POE) from the PSE in response to the PD providing the classification load on the communications link and the PD sending the packet that indicates the length of the communications link.

8. A method performed by a powered device (PD), the method comprising:
transmitting or receiving data, by the PD, via a communications link with a power source equipment (PSE); and
determining, by the PD, a length of the communications link;
determining, by the PD, a classification load for the PD based on a power need of the PD;
providing, by the PD, the determined classification load onto the communications link; and
sending a packet from the PD to the PSE indicating the length of the communications link.

9. The method of claim 8 wherein the determining a length of the communications link comprises determining, by the PD, a propagation delay for the communications link based on a synchronization message exchange between the PSE and the PD in accordance with IEEE 802.1AS, and to determine a length of the communications link.

10. The method of claim 8 wherein the determining a length of the communications link comprises:
determining, by the PD, a propagation delay for the communications link; and
determining, by the PD, a length of the communications link based on the propagation delay of the communications link.

11. The method of claim 8 wherein the classification load includes a resistance applied by the PD onto the communications link to identify a power requested by the PD to the PSE.

12. The method of claim 8 and further comprising the power source equipment (PSE) performing the following:
measuring the power classification of the PD based on the classification load for the PD;
receiving the packet that indicates the length of the communications link; and
determining an amount of power to be supplied via Power Over Ethernet (POE) from the PSE to the PD based on the measured power classification and the packet.

13. The method of claim 12 wherein the PSE measuring the power classification comprises the power source equipment (PSE) performing the following:
measuring the power classification comprises the second controller being configured to:
causing a voltage to be applied to the communications link;
measuring the resulting classification current; and
determining the power classification of the PD based on the classification current in response to the classification load provided by the PD.

14. The method of claim 8 and further comprising receiving by the PD power via Power Over Ethernet (POE) from the PSE in response to the PD providing the classification load on the communications link and sending the packet.

15. A powered device (PD) comprising:
means for transmitting or receiving data, by the PD, via a communications link with a power source equipment (PSE);
means for determining, by the PD, a length of the communications link;
means for determining, by the PD, a classification load for the PD based on a power need of the PD; and
means for providing, by the PD, the determined classification load onto the communications link; and
means for sending a packet from the PD to the PSE indicating the length of the communications link.

16. The apparatus of claim 15 wherein the means for determining a length of the communications link comprises means for determining, by the PD, a propagation delay for the communications link based on a synchronization message exchange between the PSE and the PD in accordance with IEEE 802.1AS, and to determine a length of the communications link.

17. The apparatus of claim 15 wherein the means for determining a length of the communications link comprises:
- means for determining, by the PD, a propagation delay for the communications link; and
- means for determining, by the PD, a length of the communications link based on the propagation delay of the communications link.

18. The apparatus of claim 15 wherein the classification load includes a resistance applied by the PD onto the communications link to identify a power requested by the PD to the PSE.

* * * * *